United States Patent [19]

Nomura et al.

[11] 4,422,117

[45] Dec. 20, 1983

[54] THIN FILM MAGNETIC HEAD AND METHOD OF MAKING IT

[75] Inventors: Noboru Nomura, Kyoto; Kenji Kanai, Neyagawa; Nobuyuki Kaminaka, Moriguchi; Norimoto Nouchi, Katano, all of Japan

[73] Assignee: Matsushita Electric Industrial Co., Ltd., Kadoma, Japan

[21] Appl. No.: 254,662

[22] Filed: Apr. 16, 1981

[30] Foreign Application Priority Data

Apr. 11, 1980 [JP] Japan .................................. 55-95392
Apr. 17, 1980 [JP] Japan .................................. 55-51211
May 7, 1980 [JP] Japan .................................. 55-60880

[51] Int. Cl.$^3$ .......................... G11B 5/12; G11B 5/20; G11B 5/22
[52] U.S. Cl. .................................. 360/126; 360/122; 360/123; 360/127
[58] Field of Search ............... 360/126, 125, 123, 127, 360/122, 119; 427/48, 131, 127; 428/900

[56] References Cited

U.S. PATENT DOCUMENTS

| | | | |
|---|---|---|---|
| 4,052,749 | 10/1977 | Nomura et al. | 360/126 |
| 4,092,688 | 5/1978 | Nomura et al. | 360/126 |
| 4,127,884 | 11/1978 | Nouchi | 360/127 |
| 4,191,983 | 3/1980 | Gibson | 360/126 |
| 4,241,367 | 12/1980 | Nomura et al. | 360/127 |
| 4,246,620 | 1/1981 | Kaminaka | 360/127 |

*Primary Examiner*—Alfred H. Eddleman
*Attorney, Agent, or Firm*—Wenderoth, Lind & Ponack

[57] ABSTRACT

A thin film magnetic head has a substrate with thin film layers deposited thereon and a protector layer bonded by a bonding layer to the substrate, with the thin film layers interposed therebetween. The thin film layers includes components of an electromagnetic transducing means. The bonding layer is a glass having a working temperature at which a magnetic layer included in the thin film layers does not have the magnetic characteristics deteriorated to any substantial degree.

The fusing of the glass for making the bonding layer is performed at a temperature below 450° C.

10 Claims, 16 Drawing Figures

MAGNETIC FIELD

MAGNETIC FIELD

THIN FILM MAGNETIC HEAD AND METHOD OF MAKING IT

BACKGROUND OF THE INVENTION

This invention relates to a thin film magnetic head in which at least a part of a magnetic core is composed of a magnetic thin film.

With the recent progress of high density magnetic recording, it has been required to record a signal on a magnetic recording medium having a high coercive force and therefore a magnetic core material having a large saturation magnetic flux density has been needed. Further in order to obtain a high speed treatment of the signal, there has been required a magnetic head exhibiting a high permeability and a high efficiency in a high frequency range. As one of such heads, a thin film magnetic head having a construction as shown in FIGS. 1 and 2 has heretofore to been used.

Referring to these Figures, a numeral 1 denotes a ferromagnetic substrate and a conductor layer 2 is deposited on the substrate 1. The conductor layer 2 is formed by photolithographic technique so as to constitute a winding of the head and covered with an insulator layer 3. An upper magnetic layer 4 made of a material such as Permalloy is deposited on the insulator layer 3 and has a construction such as that it crosses over the conductor layer 2, so as to constitute a part of a magnetic core of the head. A protector layer 5 made of a material such as SiO$_2$ is disposed so as to cover the above-mentioned components and onto the protector layer 5 is bonded a protector plate 7 of a glass by a bonding layer 6 of a resin. The protector plate 7 is for preventing wear due to a sliding contact between the head and the recording medium.

In the thin film magnetic head as described above, the magnetic layer 4 is made so as to have a direction of easy magnetization perpendicular to the direction of a magnetic flux imparted from the recording medium, in order to have superior characteristics in the high frequency range.

Such anisotropy is apt to be described by a heat cycle. After heating in a heat cycle up to 300° C., the permeability in the direction of easy magnetization becomes about 0.7 times as large as that before the heat cycle. After heating in a heat cycle up to 500° C., the magnetic layer becomes almost isotropic. Because of such characteristics, the bonding of the protector plate 7 must be carried out at a temperature below 450° C. Therefore as the bonding layer 6 a resin which acts as an adhesive at a temperature below 450° C. has been used.

However, since the resin is soft and has a bonding strength, the bonding layer 6 is easily worn, which causes a chipping 9 of the protector plate 7 and eventually, causes a chipping 8 near the gap portion. This has been a serious defect which shortens the lifetime of the thin film magnetic head.

SUMMARY OF THE INVENTION

An object of this invention is to provide a thin film magnetic head which exhibits a high wear resistance and so ensures a long lifetime.

Another object of this invention is to provide a method suitable for making such a thin film magnetic head.

According to this invention a thin film magnetic head has a substrate, an electromagnetic tranducing means comprising layers including a magnetic layer deposited on the substrate and a protecting plate coupled to the substrate, with the electromagnetic transducing means interposed therebetween, in which said protecting plate is coupled to the substrate by a bonding glass having a working temperature at which the magnetic characteristics of said magnetic layer are not caused to deteriorate to any significant degree.

BRIEF DESCRIPTION OF THE INVENTION

DETAILED DESCRIPTION OF THE INVENTION

Figure 1:
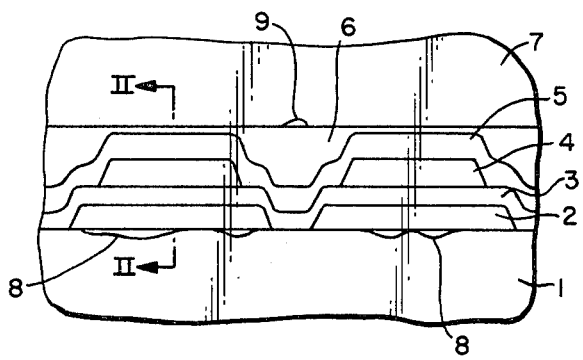
FIG. 1 is a partial elevational view illustrating a conventional thin film magnetic head.
Figure 2:
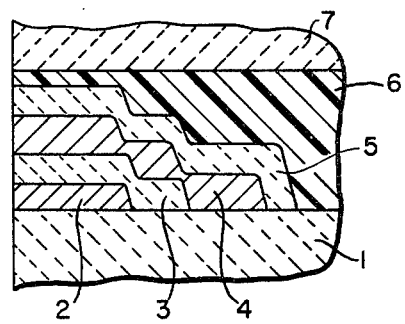
FIG. 2 is a partial sectional view of the thin film magnetic head of FIG. 1 along a line II—II.
Figure 3:
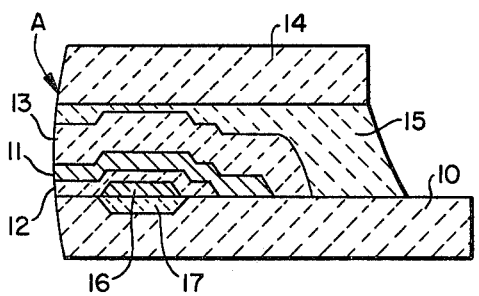
FIG. 3 is a partial sectional view illustrating an embodiment of a thin film magnetic head according to this invention.

FIG. 3 shown a thin film magnetic head of one embodiment of this invention. There is first described the construction of a portion near a surface A of this head at which the head comes in contact with a magnetic recording medium. On a magnetic substrate 10 made of a material such as ferrite is disposed an upper magnetic thin film 11 made of Permalloy or Sendust, etc., with a non-magnetic insulator layer 12 made of SiO$_2$ or Al$_2$O$_3$, etc., interposed therebetween. The substrate 10 and the magnetic film 11 constitute a magnetic head core and the insulator layer 12 forms an operating gap. On the magnetic film 11 is disposed a wear resistant layer 13 which may be SiO$_2$ or Al$_2$O$_3$, etc. A non-magnetic protector plate means in the form of a protecting plate 14 is bonded onto the wear resistant layer 13 and the substrate 10 by a bonding layer 15 of a low melting point glass.

Within the internal region is provided a conductor layer 16 disposed on the substrate 10. The conductor layer 16 constitutes a winding of the head and crosses between the substrate 10 and the insulator layer 12. At the surface region of the substrate 10 under the conductor layer 16 is provided a separating groove 17 filled with a non-magnetic material such as a glass. This groove 17 serves to make the transfer efficiency of magnetic flux generated by the conductor layer 6 higher.

The magnetic film 11 has an axis of easy magnetization in a direction perpendicular to the drawing surface, so that the axis of easy magnetization is in the direction perpendicular to the magnetic flux which is imparted from a recording medium into a magnetic circuit constituted by the substrate 10 and the magnetic film 11. Such anisotropy is provided for obtaining good high frequency characteristics because the frequency response is superior in the direction of hard magnetization.

The glass used for the bonding layer 15 is required to have a working temperature below 450° C., the working temperature being the temperature at which the glass can be fused. A glass containing lead oxide as a principal component may be used. Although such lead glass is rather soft, brittle and has low wear resistance as compared to various other glasses, it is satisfactorily harder than a resin, so as to remarkably improve the wear resistance of the thin film magnetic head.

An example of such a low working point glass is one having the composition including 60 to 80 wt % of PbO, 3 to 12 wt % of $PbF_2$, 9 to 14 wt % of $B_2O_3$, 0.5 to 2 wt % of $SiO_2$, 0 to 7 wt % of ZnO, 2 to 8 wt % of $Bi_2O_3$, 0 to 10 wt % of $Tl_2O$ and 0 to 2 wt % of $TiO_2$. The limitations of the composition are based on the following experimental results and considerations.

(i) With PbO in an amount more than 80 wt %, it is difficult to make a glass, and with PbO in an amount less than 60 wt %, the viscosity of the glass becomes so large that bonding at low temperature is difficult.

(ii) With $PbF_2$ in an amount more than 12 wt %, the composition is apt to be crystallized, which makes flow of the material during fusing difficult. With PbF in an amount less than 3 wt %, the viscosity of the glass becomes too large to perform the low temperature bonding.

(iii) With $B_2O_3$ in an amount more than 14 wt %, the viscosity becomes too large to perform the low temperature bonding, and with $B_2O_3$ in an amount less than 9 wt %, it is difficult to make the glass.

(iv) With $SiO_2$ in an amount more than 2 wt %, the viscosity becomes too large to perform the low temperature bonding, and with $SiO_2$ in an amount less than 0.5 wt %, water resistance and chemical resistance are low, and further the composition is apt to be crystallized.

(v) With ZnO in an amount more than 7 wt % and $Bi_2O_5$ in an amount more than 5 wt %, the composition is apt to be crystallized, which makes flow of the material during fusing difficult.

(vi) With $Tl_2O$ in an amount more than 10 wt %, the composition is apt to be crystallized.

(vii) With $TiO_2$ in an amount more than 2 wt %, the composition is apt to be crystallized.

Since the glasses having such compositions have a working temperature from 320° to 400° C., by using those glasses for the bonding layer 15 a thin film magnetic head having high wear resistance is obtained, without exerting a bad influence on the magnetic layer 11.

Between the wear resistant layer 13 and the bonding layer 15 a co-diffusion occurs, so that there is diffused into a portion of the bonding layer 15 $SiO_2$, ZnO, $TiO_2$ or a component more stable than the bonding glass, and thereby such portion is given improved water resistance and chemical resistance. It increases the stability and strength of the bonding.

Figure 4:
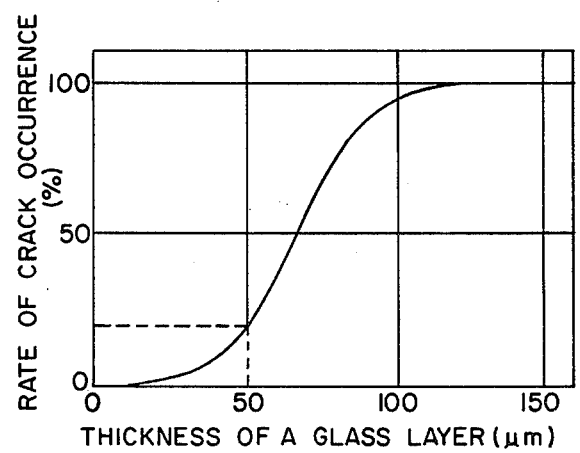
FIG. 4 is a graph showing the relation between the thickness of a glass bonding layer and the rate of crack occurrence.

The glasses as described above are weak with respect to thermal shock. When it is kept at the working temperature for a long time, crystalization occurs, and if cooled down rapidly, it is cracked. In order to increase the resistance to thermal shock, the bonding layer is required to be thin, as seen from FIG. 4. This is based on the fact that the rate of occurrence of microcrack within the glass layer is reduced by making the glass layer thinner, whereby the glass layer has increased mechanical strength. When the thickness of the glass layer is smaller than 50 $\mu$m, the rate of crack occurrence is lower than 20% which is satisfactory in practical use.

By using the composition of the glass for the bonding layer and the thickness thereof as described above, it is possible to obtain a thin film magnetic head including an anisotropic magnetic film, with high wear resistance and high yield in manufacturing.

In the head having the structure as shown in FIG. 3, the protector plate 14 covers the region beyond the rear end of the wear resistant layer 13. Therefore the bonding layer 15 has, at the rear portion of the head, a thickness equal to the total thickness of the wear resistant layer 13, the magnetic film 11, the insulator layer 12 and the conductor layer 16, which possibly exceeds 50 $\mu$m, causing the layer to be easily cracked.

Figure 5:
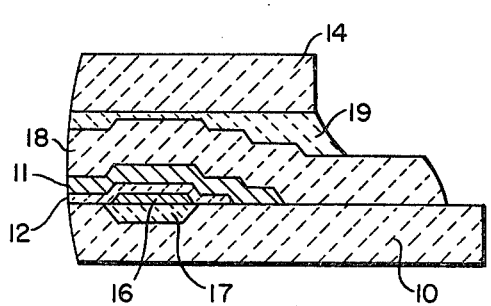
FIG. 5 is a sectional view of another embodiment a thin film magnetic head according to the invention.

Such disadvantage is overcome by constructing the head as shown in FIG. 5. In this construction the wear resistant layer 18 is extended beyond the rear end of the protector plate 14, so that the bonding layer 19 has only to fill the gap between the protector layer 14 and the wear resistant layer 18. Thus the thickness of the bonding layer 19 may be made very much smaller.

A process for bonding the protector layer includes heating of the bonding glass to fuse it, during which the magnetic layer is possibly oxidized, resulting in loss of the soft-magnetism. If the oxidation reaches only a small extent of the surface portion of the magnetic layer, the permeability of the whole layer is not deteriorated to any substantial degree. To suppress the oxidation as much as possible, the magnetic layer should be isolated from the air during the heating process from softening to fusing of the glass.

Figure 6:
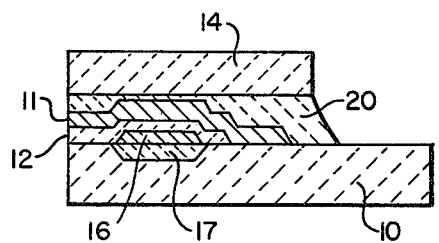
FIG. 6 is a sectional view of a still further embodiment of a thin film magnetic head according to the invention.

In a case where the wear resistant layer is not provided as shown in FIG. 6, in which the protector plate 14 is directly bonded to the magnetic layer 11 by a bonding glass 20, there is a great possibility that the magnetic layer 11 will be exposed to air during the heating. To isolate the magnetic layer from air during the heating process as long as possible, the bonding glass should be pressed against the magnetic layer 11 through the protector layer 14, from the beginning of the heating. Thereby when the temperature of the glass exceeds the softening point and reaches about 300° C. at which oxidation of the magnetic layer is opt to begin, the glass begins to be deformed so as to be closely contacted with the magnetic layer. Thus at the working temperature of 450° C., the glass sufficiently covers the magnetic layer, so that the oxidation of the magnetic layer is suppressed to the extent that it is practically negligile.

In the structure as shown in FIG. 3, the wear resistant layer 13 should be thick in order to avoid a bad influence due to wear of the bonding layer 15. If the thickness of the wear resistant layer 13 is small, the bonding layer 15 is severely worn, causing the wear resistant layer 13 to be worn by an exponentially increasing amount. The magnetic layer 11 is similarly worn.

By making the wear resistant layer of $Sio_2$ or $Al_2O_3$ with a thickness of 3 $\mu$m, the amount of wear of the glass bonding layer 15 is about 0.5 $\mu$m after a sliding contact with a magnetic tape for 100 hours, and so it is possible to record or reproduce a short wave signal with a recorded wavelength of about 5 $\mu$m.

On the other hand, the bonding glass layer is required to have a thickness less than 50 $\mu$m for the purpose of reducing the crack occurrence. In the case of the head structure of FIG. 3 in which the wear resistant layer 13 is not extended to fill the gap between the substrate 10 and the protector plate 14, the absence of the wear resistant layer 13 at the rear portion of the head makes the bonding layer 15 thicker at the rear portion of the head. Therefore the wear resistant layer 13 should have a thickness less than 40 $\mu$m in view of the fact that the total of the thicknesses of the magnetic layer 11, the conductor layer 16 and the insulator layer 12 is about 10 $\mu$m.

Thus the wear resistant layer 13 preferably has a thickness between 3 $\mu$m and 40 $\mu$m, in order to obtain a thin film magnetic head in which it is difficult for the bonding glass layer to be worn and cracked.

In a case of a multichannel thin film magnetic head in which a plurality of unit heads are disposed on the same substrate and are operated in connection with each other, it is important to align the operating gaps of the unit heads.

If the thermal expansion coefficients of the magnetic substrate and the protector plate are different from each other, there is caused a deflection of the substrate due to the difference between the temperature at the fusing of the bonding layer and room temperature. Since the glass for the bonding layer has a high modulus of elasticity such as $2.5 \times 10^{-10}$ Newton/m$^2$, it cannot absorb the abovementioned deflection, which is different from the resin conventionally used. The deflection of the substrate causes a misalignment of the gaps of the unit heads.

Figure 7:
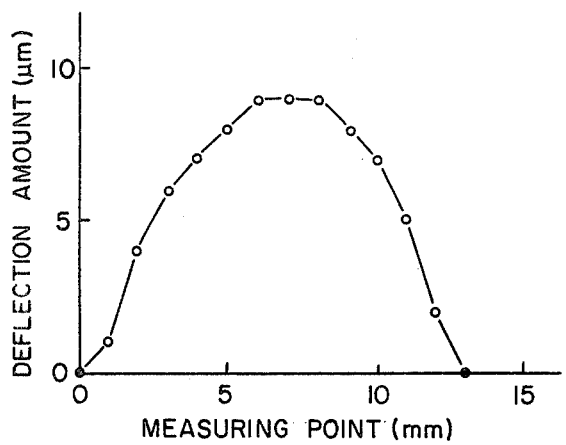
FIG. 7 is a graph showing the amount of deflection of a substrate due to fusing of a glass.

FIG. 7 shows an example of such misalignment in a head in which the magnetic substrate is made of a ferrite, the protector plate a glass having a thermal expansion coefficient approximately that of the substrate and the bonding layer glass. In this figure, the amount of deflection represents the distance from a line at the gap of each unit head at each measuring point to a straight line connecting the gaps of two unit heads located respectively at the opposite ends of the magnetic substrate, wherein the distance between the unit heads at the two ends is 13 mm. Such a large deflection as 9 $\mu$m was observed in at the central region.

Figure 8:
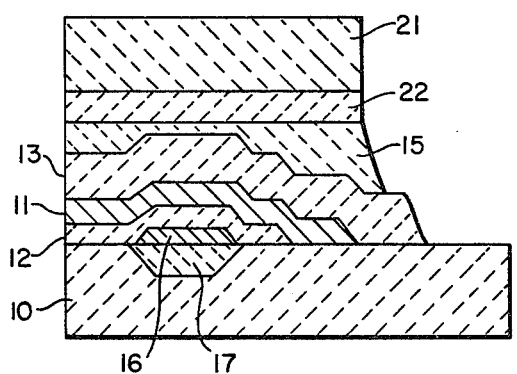
FIGS. 8 and 9 are sectional views of further embodiments of thin film magnetic heads according to the invention.

In order to avoid such disadvantage, a structure as shown in FIG. 8 may be employed. This structure differs from that of the embodiment in FIG. 5 in employing a protector plate means in the form of a compensating plate 21 with a protector layer 22 deposited thereon. The compensating plate 21 is made of the same material as the magnetic substrate 10, whereby the deflection of the substrate 10 due to the difference between thermal expansion coefficients of the substrate 10 and the protector layer 22 is greatly suppressed. Further since the substrate 10 and the compensating plate 21 magnetically shield the elctro-magnetic transducing elements, noise from the outside of the head is reduced.

Figure 9:
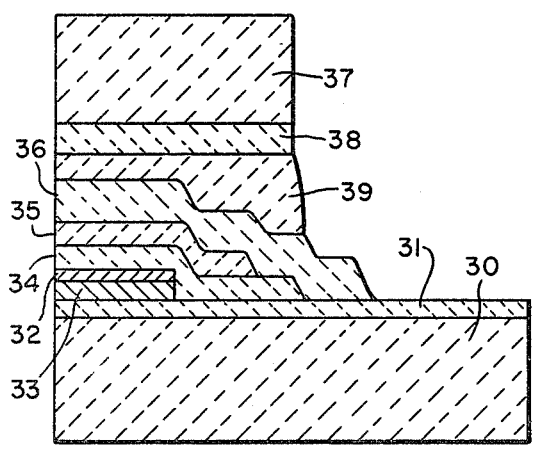

FIG. 9 shows another embodiment of the invention in which a construction for preventing the deflection of the substrate is employed. This embodiment is a head using a magnetoresistive (MR) element. On a magnetic substrate 30 is deposited a non-magnetic insulator layer 31, on which an MR element 32 is disposed with a biasing layer 33 between it and the layer 31. The MR element 32 is covered with a non-magnetic insulator layer 34. A magnetic layer 35 is disposed on the insulator layer 34 so as to form a magnetic shielding means in cooperation with the substrate 30. The above-mentioned elements are covered with a wear resistant layer 36 onto which is bonded a protector plate means in the form of a protector plate 37 with a wear resistant layer 38 thereon, by a bonding glass layer 39. The protector plate 37 is made of the same material as the substrate 30. With such a structure, it was possible to reduce the amount of misalignment of the gaps to within 0.2 $\mu$m in a head ½ inch wide.

Now, there will be described a process for bonding the protector plate by using a glass.

As described above, the glass for the bonding layer should have the working temperature below 450° C. And if a glass containing a large amount of lead is used, the following problem has to be considered and overcome. The problem is that during heating of the glass up to the working point and cooling thereafter, there can be formed within the glass microcrystalline particles having a size from 30 $\mu$m to 100 $\mu$m, whereby the fused glass becomes brittle and further the thickness thereof becomes larger that it cannot be kept smaller than 50 $\mu$m.

Figure 10:
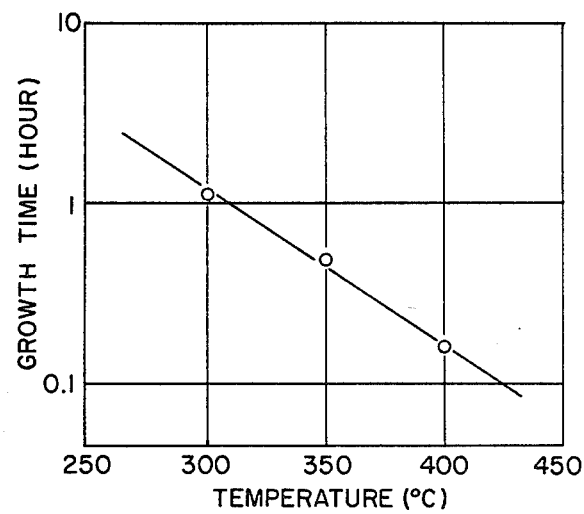
FIG. 10 is a graph showing the relation between the temperature and the growth time of a microcrystal in a bonding glass.

FIG. 10 shows the relation between the temperature and the time for the growth of the microcrystalline particles. The bonding glass has to be kept at the working temperature for a given time during the bonding process, in order that co-diffusion occurs between the layers to be bonded and the glass and thereby the fusing is completed. If it takes a long time to raise the temperature to the working point, the likelihood of formation of microcrystalline particles is high, which makes it difficult to keep the fused glass layer thin by compression at the working temperature.

Figure 11:
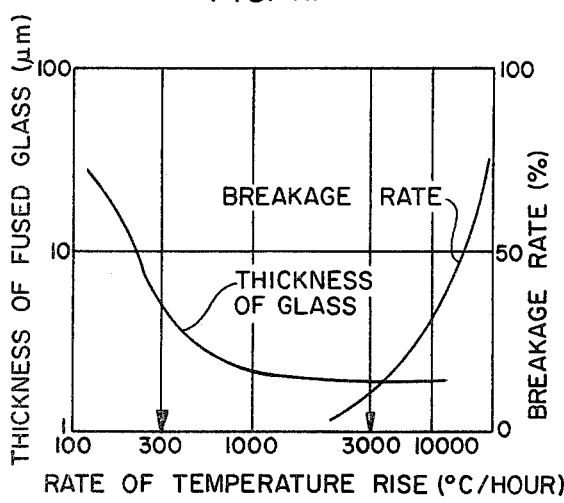
FIG. 11 is a graph showing relations of the thickness of fused glass and the breakage rate of a bonding glass for the rate of temperature rise.

In a condition where the working temperature is 400° C. and the rate of temperature rise is 200° C./hour, it takes 15 minutes for raising temperature from 350° C. to 400° C., so that crystallization occurs during the heating process up to 400° C. If the rate of temperature rise is higher than 300° C./hour, it is possible to raise the temperature of the glass to 400° C. before the crystallization occurs, so that the fused glass layer can be made thinner than several $\mu$m, as shown in FIG. 11. On the other hand, if the rate of temperature rise is higher than 5000° C./hour, the object to be bonded is broken due to thermal stress.

Figure 12:
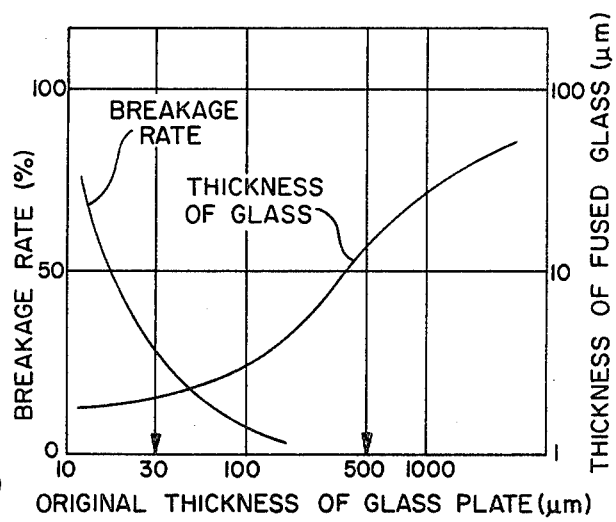
FIG. 12 is a graph showing relations of the thickness of a fused glass and the breakage rate of a bonding glass for an original thickness of a glass plate for bonding.

Even if the rate of temperature rise is in the range between 300° C./hour and 5000° C./hour, the crystallization can occur under the condition that the glass is maintained at the working temperature for a long time. Such condition may occur when using a glass with a large original thickness. The reason is that it takes a long time to extrude an excessive amount of softened glass material by pressing the substrate and the protector plate against each other, because of high viscosity due to the high lead content. As seen from FIG. 12, if a glass plate for bonding has an original thickness greater than 500$\mu$m, the required thickness of the fused glass bonding layer cannot be obtained. If the glass plate has a thickness less than 30 μm, it cannot be practically used due to the possibility of cracking during handling.

As described above, the glass plate used for bonding is required to have a thickness from 30 to 500 μm and not to include microcrystalline particles. The microcrystalline particles are produced during the heating process after vitrification. Therefore in order to obtain the glass plate without the crystalline particles, a thin glass plate should be cut from a glass block, instead of making a thin glass plate by expansion process. According to this method, it is easy to obtain a glass plate with a thickness about 50 μm.

In a case where the temperature is raised to about 450° C., there occurs a disturbance of the magnetic characteristics. For example, the permeability in the direction of hard magnetization is reduced to 0.5 times its original value. In order to avoid such disturbance, the fusing within a magnetic field is preferably employed.

Figure 13:
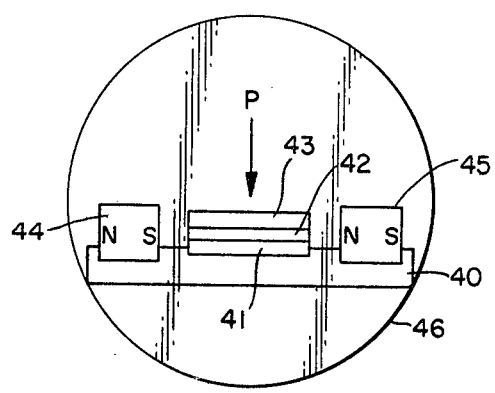
FIG. 13 is a schematic sectional view for explaining a method of fusing a bonding glass within a magnetic field.

FIG. 13 shows an example of applying the magnetic field during fusing. On a holder 40 are set the head components including a substrate 41 with elements of the transducing means deposited thereon, bonding glass 42 and a protector plate 43. On the both sides of the head components are placed permanent magnets 44 and 45 such as Alnico(Trade Mark) or a samarium cobalt magnet in positions such that the magnetic flux imparted from these magnets is oriented in the direction of the axis of easy magnetization of the magnetic layer on the substrate 41. These instruments are mounted in a electric furnace having a heater 46. Heating is performed, with a pressure P being applied to the head components. Since the temperature is raised to about 370° C., the residual magnetization and coercive force of the permanent magnets are apt to be reduced. The magnetic field should be kept at a magnitude larger than 50 Oe during the fusing process.

Effects of applying the magnetic field during fusing are described hereinafter, referring to the case of the MR head.

Figure 14A:
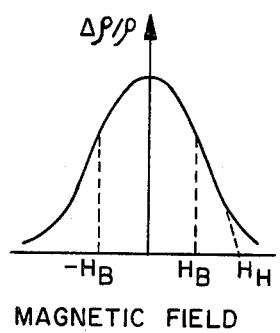
FIGS. 14A and 14B are graphs showing magnetoresistive characteristics of a thin film magnetic head.
Figure 14B:
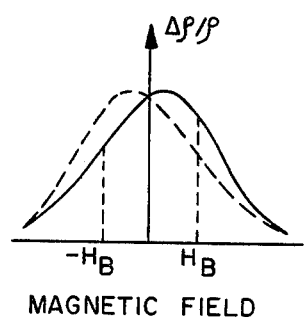

If the MR element is sufficiently anisotropic, the relation between an applied magnetic field and the rate of resistivity change $\Delta\rho/\rho$ of the MR element has a symmetrical characteristic as shown in FIG. 14A. If the anisotropy of the MR element is disturbed by the temperature rise during fusing, such relation exhibits hysteresis such as represented by a butterfly like curve shown by the solid line and the chain line in FIG. 14B. In a transducer in which two MR elements are operated in Push-Pull relation by applying a biasing magnetic field $H_B$, the characteristic as shown in FIG. 14B is so inconvenient as not to be able to achieve the effect of the Push-Pull operation.

A permeability in MR characteristics is defined at a point $H_H$ in FIG. 14A, which is the intersection between the abscissa and an extension of a tangent to the maximum gradient on the characteristic curve. The permeability $\mu$ is represented by $B_S/H_H$, where $B_S$ is the saturation magnetic flux density of the MR element.

Figure 15:
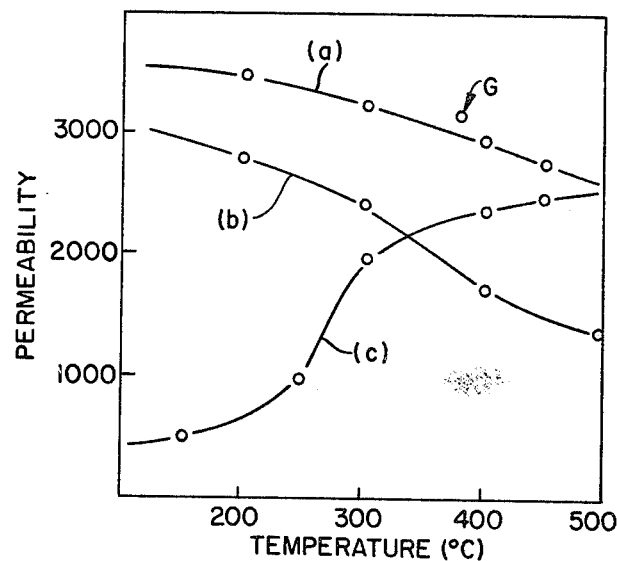
FIG. 15 is a graph showing relations between permeability change and the temperature of heat treatment.

FIG. 15 shows the permeability changes caused by heat treatment corresponding to the heating during the fusing process. The abscissa represents the temperature of the heat cycle and the ordinate the permeability at room temperature.

The curve (a) shows the case where a magnetic layer with induced anisotropy produced by a deposition within a magnetic field is subjected to the heat treatment within the magnetic field in the same direction as that of the induced anisotropy. In this case the deterioration of the permeability is not so large as to affect the practical use, even if the heat treatment is performed at a high temperature such as 450° C.

The curve (b) shows the case where a magnetic layer is not given an induced anisotropy prior to the heat treatment and the heat treatment is performed within the magnetic field. In this case the induced anisotropy is given by the heat treatment and the permeability becomes fairly large after the treatment at about 400° C.

The curve (c) shows the case where a magnetic layer with the induced anisotropy given is subjected to the heat treatment without a magnetic field. After the treatment at about 400° C. the permeability is reduced by a rather larger amount than that in the case of the curve (a).

The point G is for an example of the result of an actual fusing process according to the method as shown in FIG. 13. The permeability is not reduced very much, similarly to the experiment represented by the curve (a).

As seen from the comparison between the curves (b) and (c), during the fusing process within a magnetic field, an anisotropy is induced due to a magnetic annealing effect.

Since even in the case of the curve (a) the permeability is notably reduced when the temperature is raised to above 500° C., the fusing of a bonding glass should be performed at a temperature below 450° C.

What is claimed is:
1. A thin film magnetic head comprising:
   a substrate;
   thin film layers deposited on said substrate and including components of an electromagnetic transducing means, one of which is a magnetic layer;
   a wear resistant layer on said thin film layers;
   a protector plate means for covering the thin film layers; and
   a bonding layer bonding said protector plate means to said wear resistant layer, said bonding layer being a glass having a working temperature no higher than the highest temperature at which the magnetic properties of said magnetic layer are substantially retained and having a thickness less than 50 μm.

2. A thin film magnetic head as claimed in claim 1, wherein said wear resistant layer has a thickness between 3 μm and 50 μm.

3. A thin film magnetic head as claimed in claim 1, wherein said substrate and said protector plate means are made of the same material.

4. A thin film magnetic head as claimed in claim 3, wherein said substrate and said protector plate means are made of a magnetic material having high permeability.

5. A thin film magnetic head as claimed in claim 4, wherein said magnetic material comprises a single crystalline ferrite.

6. A thin film magnetic head as claimed in claim 2, wherein said glass of the bonding layer has a composition comprising 60 to 80 wt % of PbO, 3 to 12 wt % of PbF$_2$, 9 to 14 wt % of B$_2$O$_3$, 0.5 to 2 wt % of SiO$_2$, 0 to 7 wt % of ZnO, 2 to 8 wt % of Bi$_2$O$_3$, 0 to 10 wt % of Tl$_2$O and 0 to 2 wt % of TiO$_2$.

7. A thin film magnetic head as claimed in claim 6, wherein said glass bonding layer has a thickness smaller than 50 μm.

8. A thin film magnetic head as claimed in claim 6, further comprising a layer of an oxide material having neutral or oxidative property as a surface layer to which said glass bonding layer is fused.

9. A thin film magnetic head as claimed in claim 8, wherein said oxide material layer is SiO$_2$, ZnO, TiO$_2$ or a thin film of glass.

10. A thin film magnetic head as claimed in claim 1, wherein said wear resistant layer extends beyond the edge of said protector plate means opposite the edge to be contacted by a recording medium and the protector plate means is bonded only to the wear resistant layer.

* * * * *